United States Patent [19]

Harris

[11] Patent Number: 5,121,738
[45] Date of Patent: Jun. 16, 1992

[54] HEAT RADIATING BRIQUETTE FOR COOKING GRILL

[76] Inventor: Robert S. Harris, 559 W. Eugenie, Chicago, Ill. 60614

[21] Appl. No.: 685,863

[22] Filed: Apr. 16, 1991

[51] Int. Cl.⁵ .............................................. F24C 3/00
[52] U.S. Cl. .............................. 126/41 R; 126/25 R; 126/39 D
[58] Field of Search ................ 126/41 R, 41 B, 41 C, 126/41 D, 41 E, 39 D, 25 R; 44/530, 531–532, 550, 596, 600

[56] References Cited

U.S. PATENT DOCUMENTS

| | | | |
|---|---|---|---|
| 2,908,214 | 10/1959 | Persinger | 126/25 R |
| 3,692,013 | 9/1972 | Grafton et al. | 126/41 R |
| 4,276,869 | 7/1981 | Kern | 126/41 R |
| 4,535,748 | 8/1985 | Hunerwadel | 126/25 R |

*Primary Examiner*—Larry Jones
*Attorney, Agent, or Firm*—Silverman, Cass & Singer, Ltd.

[57] ABSTRACT

A heat radiating briquette for a cooking grill is formed of a suitable ceramic refractory or other material to have a rectilinear, flat base, a pyramid upstanding from the base and a perimetric trough encompassing the base of the pyramid. Each face of the pyramid is provided with a series of grooves extending from the apex to the base of the pyramid and communicating with the trough. A multiplicity of like briquettes are to be arranged over the surface of a supporting grate spaced below with their apices pointed upwardly toward the food support grill and spaced above the heat source of the food grill. The side edges of adjacent briquettes on the grate are abutting so as to substantially prevent inadvertent seepage of food renderings to the heat source. Renderings from food cooking on the food supporting grill impinge on the briquettes and flow downwardly along the grooves to collect in the trough. The heat source heats the briquettes and the renderings in the trough so that heat is radiated from both briquettes and renderings upwardly to cook the food on the food supporting grill.

8 Claims, 2 Drawing Sheets

HEAT RADIATING BRIQUETTE FOR COOKING GRILL

FIELD OF THE INVENTION

This invention relates to gas-fired or electrical cooking grills, such as a barbeque grill and particularly, relates to a novel heat radiating briquette adapted to be positioned between the heat source and the food supporting grid of the cooking grill.

BACKGROUND OF THE INVENTION

It is known to provide refractory material which is supported on a grate between the heat source and food supporting grill. Such refractory material distributed across the grate radiates heat to the food on the food supporting grill. Such briquettes 100 of refractory material are disclosed in U.S. Pat. No. 4,593,676 arranged on a grate to provide gaps 102, 103, 104 and 105 for the reasons described. The briquette 100 is described as being in the general form of a four-sided pyramid and illustrated either as having flat, smooth faces or shadowed presumably to demonstate flat smooth faces.

In U.S. Pat. No. 4,276,869 there is disclosed a molded refractory slab having an upper surface formed with a plurality of frusto-conical upward projectors 27. The sides 29 of the projections 27 are inclined about 45 from the horizontal, appear to be smooth and form valleys between the adjoining portion of adjacent projections.

In U.S. Pat. No. 4,043,312, refractory material briquettes 25 are supported on a grate dispersed much like charcoal or coke briquettes and being of irregular configuration.

U.S. Pat. Nos. 3,646,928 and 3,692,013 also disclose refractory material briquettes of which the top and bottom formations are in the general form of a trunicated pyramid with smooth faces.

The briquette for a cooking grill embodying the herein invention is formed of a suitable refractory or other heat radiating material such as a suitable metal or metal composition and includes a general rectilinear, flat base having a medial pyramid formation upstanding from said base. Said base has a perimetric trough encompassing the base of the formation. Each face of the pyramid formation includes a series of striations or grooves extending from the apex to the base of the formation and communicating with said trough. The invention contemplates arranging like briquettes to overlie the surface of the supporting grate of the grill with the apices thereof oriented upwardly toward the food supporting grill and the side edges of adjacent briquettes abutting so as to prevent inadvertent seepage of renderings from the food being grilled from escaping inadvertently to the heat source below the supporting grate. Such renderings in the form of liquified grease or oil impinge on the briquettes and flow downwardly along the striations or grooves to collect in the trough so that the heat from the heat source not only heats the briquette, but also heats the grease or oil collected in the trough. Thus, heat is radiated to the cooking food on the grill above both from the briquettes and the renderings collected in the trough.

SUMMARY OF THE INVENTION

A heat radiating briquette for a cooking grill is formed of a suitable ceramic refractory or other material to have a general rectilinear, flat base, a medial pyramid formation upstanding from the base and a perimetric trough encompassing the base of said formation. Each face of the pyramid formation is provided with a series of grooves extending from the apex to the base of the formation and communicating with the trough. A multiplicity of like briquettes are adapted to be arranged over the surface of a supporting grate spaced below with their apices pointed upwardly toward the food support grill and spaced above the heat source of the food grill. The side edges of adjacent briquettes on the grate are abutting so as to substantially prevent inadvertent seepage of food renderings to the heat source. Renderings from food cooking on the food supporting grill impinge on the briquettes and flow downwardly along the grooves to collect in the trough. The heat source heats the briquettes and the renderings in the trough so that heat is radiated from both briquettes and renderings upwardly to cook the food on the food supporting grill.

The invention includes providing rectilinear shaped briquettes of square or rectangular configuration.

DESCRIPTION OF THE INVENTION

Figure 1:
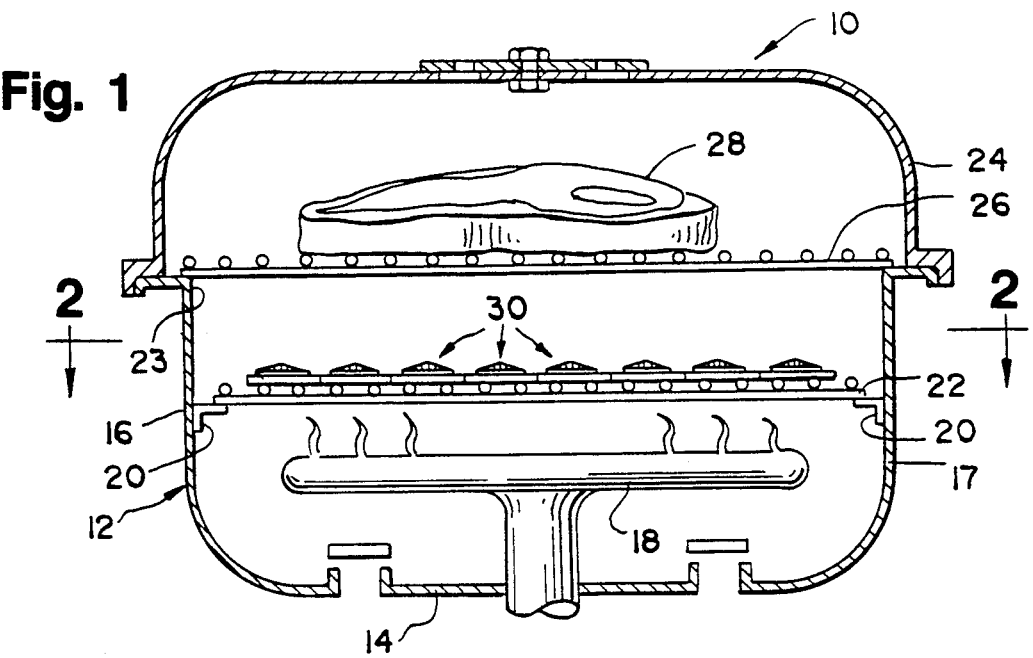
FIG. 1 is a transverse vertical sectional view taken through a representative cooking grill and shown incorporating the briquettes of the invention.

Referring to FIG. 1, the reference character 10 identifies generally a grill of the type for cooking or barbequeing food. The grill 10 usually is supported on a upright not shown. The numeral 12 identifies the bottom portion or fire-box having a bottom wall 14 and upright side walls 16 and 17. A gas burner unit 18 is located in the fire-box 12 for radiating heat upwardly from the burner unit. Spaced above the bottom wall 14 and secured to interior surfaces of the side walls 16 and 17 are a pair of facing flanges 20 on which is installed a supporting grate 22.

Mounted in a conventional manner overlying the open upper end 23 of fire-box 12 is a cover or lid 24, the cover 24 being hinged to one of the side walls 16 or 17 in a well-known manner. A food supporting grill or grid 26 is shown supported overlying the said open upper end 23 of fire-box 12 and spaced above the support grate 22. A representative steak or chop 28 is shown on grid 26 in position to be grilled by radiating heat generated by the gas burner unit 18, namely, the heat source, which also could be electrical in construction.

Figure 2:
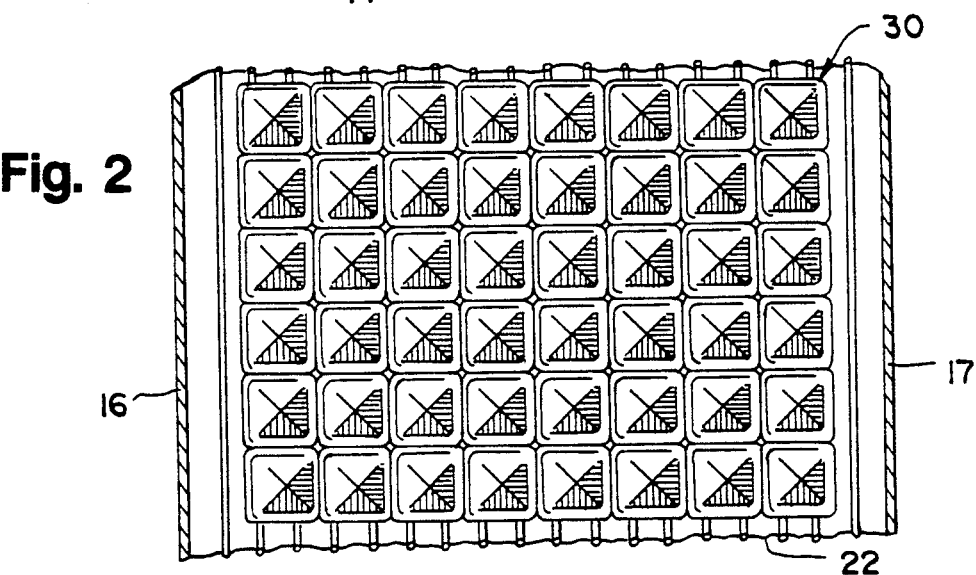
FIG. 2 is a horizontal sectional view taken along the line 2—2 of FIG. 1 and in the general direction indicated.
Figure 3:
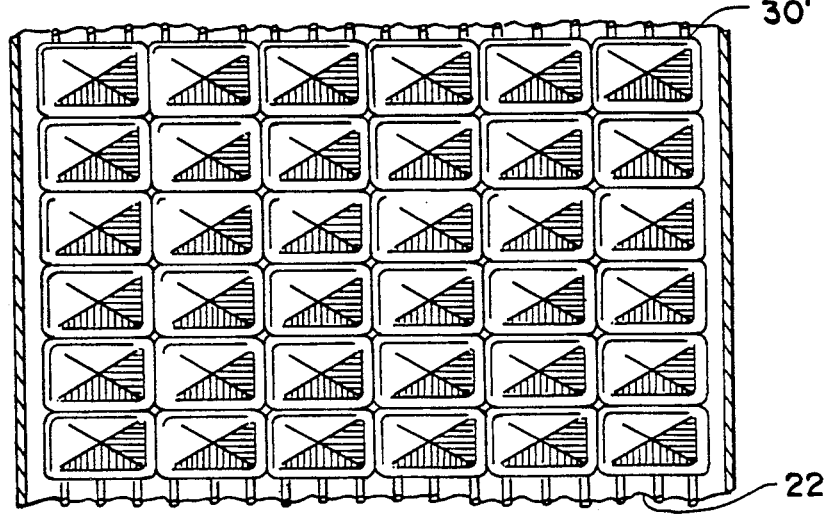
FIG. 3 is a horizontal sectional view taken similarly to FIG. 2 and illustrating a second embodiment of the invention.

Referring to FIGS. 2 and 3, a plurality of like heat radiating briquettes embodying the invention are shown in side-by-side formation overlying and supported on the grate 22. In FIG. 2, such a briquette is designated generally by the reference character 30. In FIG. 3, such a briquette is designated generally by the reference character 30'. The briquette 30 has a square configuration in plan view and the briquette 30' has a rectangular configuration plan view. However, the briquettes 30 and 30' are substantially the same in construction and function in the same manner in the cooking grill 10. As seen in FIGS. 2 and 3, the briquettes 30 and 30', respectively, are arranged in a geometric, linear array to substantially overlie the planar area or span of the support grate 22. Extremely little; if any, space is permitted at abutting edges of the briquettes in their array and at corners also by squaring off the corners as much as possible in manufacturing them.

Figure 4:
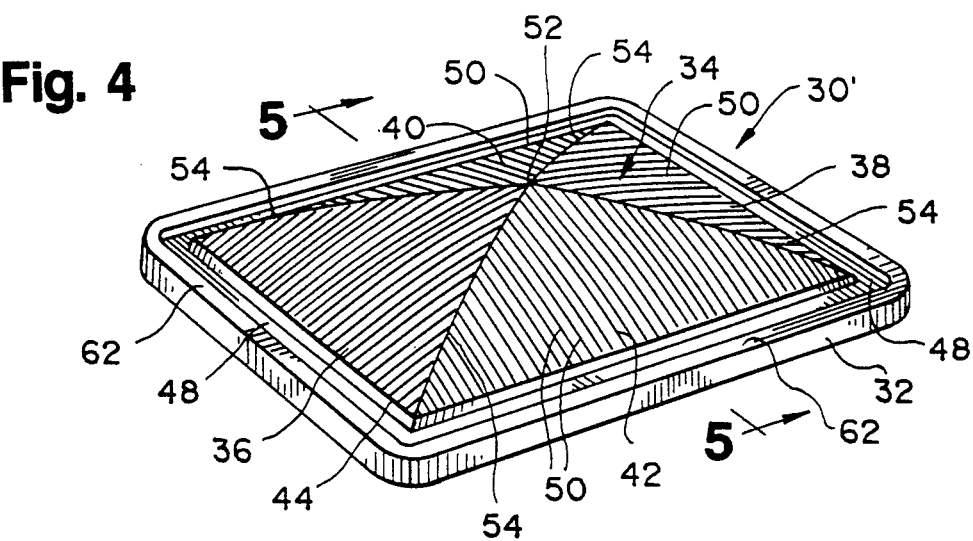
FIG. 4 is a perspective view of one embodiment of the individual briquette of the invention for cooking grill.
Figure 5:
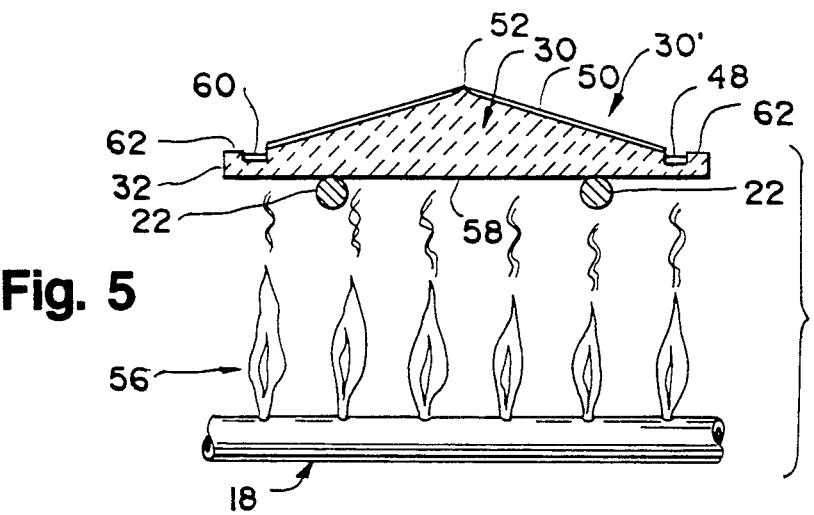
FIG. 5 is a diagrammatical illustration of a briquette embodying the invention shown in section as supported on the grate shown partially in functional relationship to the heat source of the cooking grill.

Referring to FIGS. 4 and 5, the briquette 30' is shown to be of integral structure having a base 32. Upstanding from said base 32 is a pyramid formation designated generally 34. The formation 34 has four sides 36, 38, 40 and 42 of which 36 and 38 are substantially identical and of which 40 and 42 are substantially identical. The formation 34 is located medially on said base 32 and the base of the pyramid is designated 44. The base 44 is spaced inwardly from the perimetric edge 46 of the base 32. Formed in the space between said bases 32 and 44 is a perimetric trough 48 which extends continuously around the perimetric edge of the base 44 of the pyramid formation 34.

As best seen in FIG. 4, each side face 36, 38, 40 and 42 has a series of evenly spaced striations or grooves 50 formed therein which extend from the apex 52 and the juncture line 54 between adjacent faces to open into or connect with the trough 48.

Referring to FIGS. 1 and 5. Heat 56 transmitted upwardly from the heat source 18 impinges against the bottom surface of the briquette 30' and heats the same sufficiently for heat to be radiated from the briquette upwardly through the grid 26 to cook the food product 28. As the food product 28 is grilled, fat renderings 60 drop onto the briquette and flow down the grooves 50 to collect in the trough 48. Continued heating also heats the renderings 60 in trough 48 so as also to radiate heat upwardly to assist in grilling the food product 28. The close proximity of abutting edges of briquettes 30 or 30' as seen in FIG. 2 and 3, respectively, prevents any significant amount of renderings dropping to the heater unit 18. Rendering 60 in the trough 48 also is vaporized gradually so that there is almost no overflowing of renderings 60 over the upper edges 62 of the trough 48.

Figure 6:
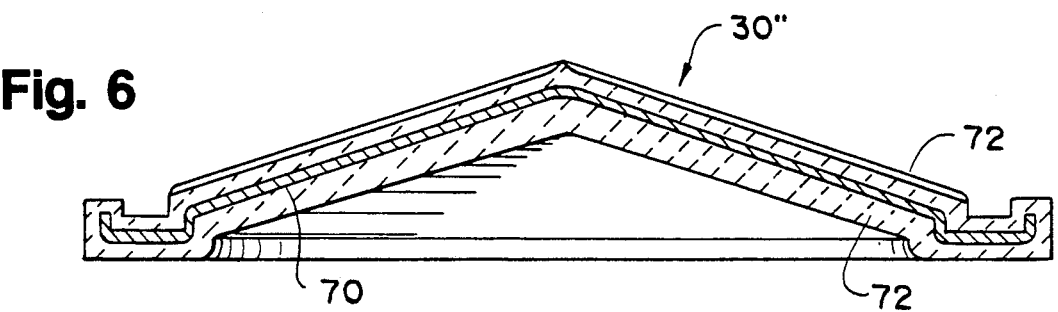
FIG. 6 is a medial vertical section taken through another embodiment of the briquette of the invention.

Briquettes 30 and 30' preferably are molded from a suitable ceramic refractory material which can radiate heat when heated, but which will not absorb renderings impinging thereon during grilling of the food. A composition of ceramic or a suitable heat resistant metal also is feasible for the briquette embodying the invention. Further, as shown in FIG. 6, the briquette designated generally 30" is formed as a metal briquette formation 70. The metal selected must withstand melting or deformation due to heating during the grilling of food.

The briquette embodying the invention can be made entirely from metal, but may have an exterior ceramic coating 72. The coating 72 may be provided on only the upper surface.

Minor variations in size and configuration of the several functional parts of the heat radiating briquette of the invention can occur to the skilled artisan without departing from the intrinsic advantages of the invention as claimed.

I claim:

1. For a food grill having a heat source, a food support grid and a grate installed spaced below the grid and spaced above the heat source for supporting an array of briquettes,
   each briquette of said briquette array comprising a flat rectilinear base, a pyramid formation having an apex, four sides and a base, a trough surrounding the base of the pyramid formation, said trough being formed by the base of the pyramid formation and a surrounding outer edge, said trough collecting renderings from food cooking on the food support grid.

2. The briquette of claim 1 in which each side of said pyramid formation has a plurality of faces extending from the apex to the base of said pyramid formation, each face having a series of spaced grooves therein opening into said trough.

3. The briquette of claim 1 which is formed as an integral refractory ceramic member.

4. The briquette of claim 1 which is formed as an integral metal member.

5. The briquette of claim 1 which is substantially square in configuration.

6. The briquette of claim 1 which is rectangular in configuration.

7. The briquette of claim 2 in which said pyramid formation has four faces and said grooves extend across the entire length of each face.

8. The briquette of claim 1 which is formed as a composite metal and ceramic member.

* * * * *